United States Patent [19]

Conroy et al.

[11] Patent Number: 5,405,741
[45] Date of Patent: Apr. 11, 1995

[54] FAST-ACTING VISCOSITY ENHANCERS FOR GELATIN SOLUTIONS

[75] Inventors: James E. Conroy, Hamlin; Nayyir F. Irani, Pittsford, both of N.Y.

[73] Assignee: Eastman Kodak Company, Rochester, N.Y.

[21] Appl. No.: 73,242

[22] Filed: Jun. 8, 1993

Related U.S. Application Data

[62] Division of Ser. No. 891,099, Jun. 1, 1992, abandoned.

[51] Int. Cl.$^6$ .............................................. G03C 1/74
[52] U.S. Cl. .................................... 430/628; 430/935
[58] Field of Search .............................. 430/935, 628

[56] References Cited

U.S. PATENT DOCUMENTS

| | | | |
|---|---|---|---|
| 2,739,137 | 3/1956 | Fowler | 524/820 |
| 3,490,911 | 1/1970 | Burness et al. | 430/623 |
| 3,811,897 | 5/1974 | Babbit et al. | 96/114 |
| 3,861,924 | 1/1975 | Mackey et al. | 96/114 |
| 4,124,397 | 11/1978 | Abele et al. | 96/109 |
| 4,175,970 | 11/1979 | LeStrange | 430/529 |
| 4,197,127 | 3/1980 | Mecca | 430/502 |
| 4,224,403 | 9/1980 | Toda et al. | 430/537 |
| 4,624,903 | 11/1986 | Simons | 430/14 |
| 4,832,991 | 5/1989 | Hayward et al. | 430/935 |
| 5,045,445 | 9/1991 | Schultz | 430/642 |
| 5,104,778 | 4/1992 | Yamanouchi et al. | 430/518 |
| 5,153,116 | 10/1992 | Metoki et al. | 430/621 |

FOREIGN PATENT DOCUMENTS

| | | |
|---|---|---|
| 49-115311 | 11/1974 | Japan . |
| 702337 | 1/1982 | U.S.S.R. . |

OTHER PUBLICATIONS

"Copolymer Thickening Agents for Photographic Casting Compositions of a Polymerizable Aliphatic Sulphonic Acid and a Water Soluble Nonionic Monomer", Anonymous, Research Disclosure 234006, Oct. 1983, pp. 311–312. No translation available.

*Primary Examiner*—John Kight, III
*Assistant Examiner*—Jeffrey Culpeper Mullis
*Attorney, Agent, or Firm*—Robert A. Gerlach

[57] ABSTRACT

A process is provided for preparing improved aqueous gelatin compositions for improved coatings, particularly light sensitive photographic coatings, wherein a viscosity increasing amount of a copolymer of an alkali metal or ammonium salt of a sulfonic acid containing polymer with an unsaturated monomer, particularly a copolymer of acrylamide and sodium-2-acrylamido-2-methylpropanesulfonate, is added to an aqueous gelatin composition at a point immediately before any point which requires a high viscosity after and a low viscosity before the addition.

15 Claims, 1 Drawing Sheet

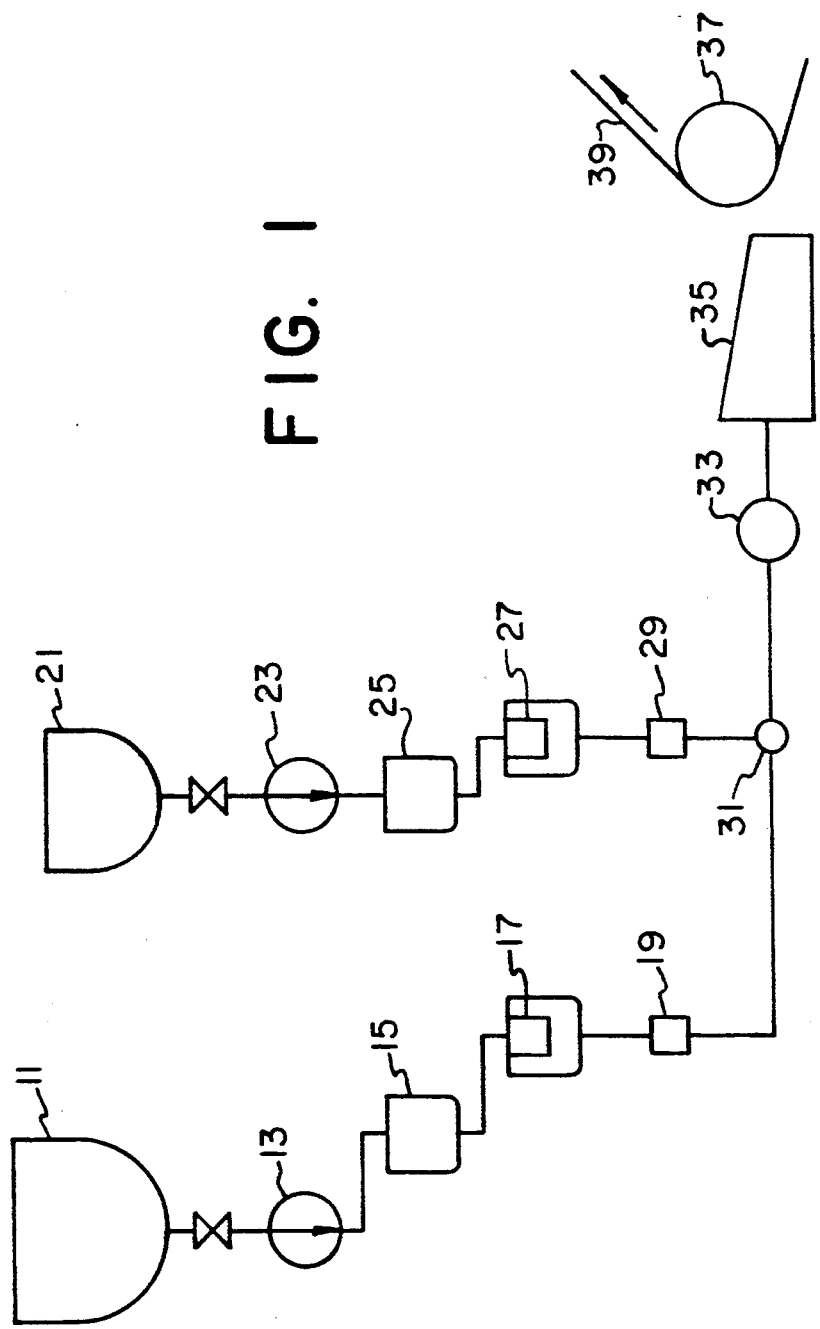

FAST-ACTING VISCOSITY ENHANCERS FOR GELATIN SOLUTIONS

This application is a division of application Ser. No. 07/891,099, filed Jun. 1, 1992, now abandoned, entitled FAST-ACTING VISCOSITY ENHANCERS FOR GELATIN SOLUTIONS.

FIELD OF THE INVENTION

This invention relates to a process for quickly increasing the viscosity of aqueous gelatin compositions, particularly those used as coatings, particularly for preparing photographic elements.

BACKGROUND OF THE INVENTION

In the manufacture of photographic products, several distinct layers may be coated simultaneously, with the number of individual layers ranging from two to as many as ten or more. Typically, a multilayer photographic coating may consist of sensitized layers and/or additional non-imaging layers. These solutions may have vastly different makeups and hence vastly different properties. Most commonly, aqueous gelatin solutions are used as a binder or suspending medium for the constituents of a given layer. The concentration of gelatin, polymers, thickening agents, and other solids determines the viscosity of the solution. It is highly desirable to be able to manipulate the viscosity of such solutions as they are handled, delivered, and then coated since optimum viscosities during the different operations may differ.

For example, photographic coatings require hardeners. Such coatings are very dilute and have a very low viscosity. To make a good coating, higher viscosities are preferred, usually 50 centipoise or higher. The advantages of high viscosities during coating include reduced flow after coating due to air impingement on the mobile (non-set) coating, reduced flow after coating due to non-planar base, reduced interfacial wave growth due to interfacial strain rate discontinuities, increased coating uniformity and the like. To insure that the required viscosity is achieved, thickeners are generally included in photographic emulsions during their preparation which is well upstream of the apparatus whereby the emulsion is coated onto the base.

But high viscosities create significant handling problems and require very high pump capability. Further, as the solubility limits of the dissolved ingredients in very high viscosity solutions are approached, the solids begin to come out of solution. When that happens, the settling solids cause coating streaks, the physical and/or sensitometric properties of the solution become unbalanced, filters become plugged, and other problems well known in the art arise.

In addition, high viscosity solutions present significant delivery problems. In order to coat uniformly and without imperfection, a coating solution must be delivered through a series of devices designed to improve the quality of the final coated film such as flowmeters, debubblers, mixers, filters, the coating hopper and the like. A pressure head is required to move a coating solution through each of these devices. The pressure head may be induced by gravity (elevation) or in-line pumps. Since pressure drop and solution viscosity are proportional for flow through a circular tube (or any other delivery expedient having a geometry where laminar flow exists), as solution viscosity increases, the pressure drop required to deliver the solution also increases if a constant flowrate is to be maintained. In practice, most delivery systems are operated very close to the upper pressure drop limit of the system. Consequently, any increase in solution viscosity could require a significant capital investment to deal with the increase.

SUMMARY OF THE INVENTION

The invention makes it possible to exploit the coating advantages of high viscosity aqueous gelatin solutions while avoiding handling and delivery difficulties by a process which comprises adding to an aqueous gelatin composition a viscosity increasing amount, at least about 5% by weight based on the weight of the aqueous gelatin composition, of a copolymer of an alkali metal or ammonium salt of a sulfonic acid-containing polymer and an unsaturated monomer just before any point which requires a high viscosity after and a low viscosity before the addition of the copolymer. The viscosity of an aqueous gelatin composition is thus increased substantially immediately by at least about 200%.

In the production of light sensitive elements, the copolymer is added to an aqueous gelatin solution or emulsion substantially immediately before the gelatin is coated onto a substrate.

The thickeners of the invention have no time dependent viscosity characteristics since the thickening kinetics are very fast. Substantially immediate thickening is generally achieved in less than about three seconds.

BRIEF DESCRIPTION OF THE DRAWING

FIG. 1 schematically illustrates a typical handling and delivery system for in-line high speed thickening of an aqueous gel composition in accordance with the invention.

DETAILED DESCRIPTION OF THE INVENTION

The invention will be described in detail with reference to its preferred embodiments, particularly as shown in FIG. 1 in which an aqueous gelatin coating composition is drawn from supply vessel 11 by means of pump 13. Pump 13 forces the coating composition through a filter 15, and then through deaerating vessel 17. Flow meter 19 monitors the flow rate of the gelatin coating composition and can regulate the output of pump 13.

The fast-acting polymeric thickener of the invention is taken from supply vessel 21 by means of metering pump 23. The thickener is pumped through filter 25, then through deaerating vessel 27 and flow meter 29. Flow meter 29 monitors the flow rate of the fast acting polymeric thickener of the invention and regulates the output of pump 23.

At junction 31, the fast-acting polymeric thickener is added to the gelatin coating composition which is then fed through mixing device 33 to coating hopper 35 where it is applied to film base 39 moving over roller 37.

Preferably, the fast-acting thickener of the invention is added to an aqueous gelatin composition to be coated onto a substrate in the preparation of a photographic element during the handling and delivery of the solution just prior to feeding the solution to a coating means.

Any other component to be added to the coating composition can be added in or with the viscosity-enhancing composition of the invention including, for example, stabilizers, sensitizers, coating aids, lubricants, extenders, dyes, brighteners, and the like, particularly thickeners.

Thickeners are commonly added to hardener-bearing layers because the hardener has a low viscosity, normally about 3 to 5 centipoise without thickener, to provide the significant dilution required to slow the time-dependent gelatin/hardener reaction and thus prevent premature coagulation of the coating composition. A delicate balance among processing conditions, solution viscosities, and desired product characteristics is required. However, when the hardener is added just prior to feeding the solution to a coating means as a component of the viscosity-enhancing composition of the invention, the upstream hazards and constraints imposed by prior processes are eliminated. When the thickener is added to a composition to be coated onto a support immediately prior to entry of the coating composition into a coating hopper or applicator, the hardener/gelatin (hydrophilic colloid) contact time is minimized, thereby minimizing hardener/gelatin reaction before the composition is coated. This reduces the risk of gelatin congealing in the hopper and/or other delivery system elements which can, in turn, cause longitudinal streaking in the coating, among other defects.

To insure solution uniformity it is preferred that the coating solution is mixed after the thickener of the invention is added. When the viscosity enhancing composition of the invention is added in-line during the handling and delivery of an aqueous gelatin coating composition, it is most advantageously added just before the coating enters the coating applicator means, generally a coating hopper, and then simply mixed to insure uniformity before entry into the applicator. For this purpose, any suitable mixing means can be installed in-line between the point of addition of the thickener and the coating means.

In one aspect, the invention is a process by which very high viscosity solutions can be delivered and coated with reduced flow after coating and reduced interfacial wave growth. Because the viscosity increase is not achieved until just before the solution enters the coating means, replacement or upgrade of existing handling and delivery systems to accommodate the increased viscosity of the coating solutions is not necessary.

In the practice of the invention, an increase in pressure drop in the handling and delivery system due to increased coating composition viscosity only occurs immediately prior to the flow of the composition through a coating means such as a coating hopper. The relationship between viscosity and pressure drop is substantially linear so that higher viscosity compositions require a higher pressure to drive the composition through the system.

The viscosity-enhancing copolymers of the invention react with aqueous gelatin so fast kinetically that viscosity increase occurs substantially instantaneously, in less than about 3 seconds, making in-line addition not only feasible but highly desirable. It is believed that the interaction between the in-line, fast-acting thickener of the invention and the gelatin is a charge interaction between the negatively charged groups on the viscosity-enhancing polymers of the invention and the positively charged groups on the gelatin. The interaction is electrostatic resulting in a substantially instantaneous reaction which generally reaches completion in less than about 3 seconds.

Aqueous compositions thickened in accordance with the invention preferably contain at least about 2% of gelatin and from about 3 to about 15 percent by weight of the gelatin composition of a fast-acting thickener of the invention, particularly a copolymer of an alkali metal or ammonium salt of a sulfonic acid-containing polymer with an unsaturated monomer, most preferably a copolymer of 2-sodium-2-acrylimido-2-methylpropanesulfonate with an unsaturated monomer, most preferably acrylamide.

Improved light sensitive and particularly photographic elements of the invention contain a layer comprising the reaction product of gelatin with a fast-acting, viscosity increasing amount of an alkali metal or ammonium salt of a sulfonic acid containing polymer. Such photosensitive elements are uniform, streak-free, and have balanced physical and sensitometric properties.

Although the invention is described in detail with reference to the viscosity enhancement of aqueous gelatin compositions, which are preferred, it is to be understood that the invention is not limited to 100% aqueous gelatin compositions. For example, the term "aqueous" is intended to include compositions containing any suitable amount of any suitable non-aqueous medium such as organic solvents and the like. The unique advantages of the invention which are obtained for completely aqueous solutions of gelatin can also be realized when the composition contains amounts up to about 10% by weight or more, as is practical, of a non-aqueous diluent such as an organic solvent or solvent mixtures miscible with water. Some such suitable organic solvent diluents include, for example, alcohols such as methanol, ethanol, isopropanol, butanol, sec-butyl alcohol, and the like; ethers such as dimethyl ether, ethyl methyl ether, diethyl ether, 1-ethoxypropane, and the like; tetrahydrofuran; glycols such as 1,2-ethanediol, 1,2-propanediol, 1,3-propanediol, and the like; ketones such as acetone, methylethylketone, 3-pentanone, methylisobutylketone, and the like; esters such as ethyl formate, methyl acetate, ethyl acetate, butyl acetate, ethyl propionate, b-ethoxyethylacetate, methyl Cellosolve acetate, and the like; amides such as formamide, acetamide, succinic amide, and the like; alkyl esters of a suitable acid such as phthalic acid, including methyl phthalate, ethyl phthalate, propyl phthalate, n-butyl phthalate, di-n-butyl phthalate, n-amyl phthalate, isoamyl phthalate, dioctyl phthalate and the like; alkyl amides such as N,N-diethyllaurylamide and the like; trimellitic acid esters including tri-tertoctyl mellitate and the like; phosphoric acid esters including polyphenyl phosphate, tricresyl phosphate, dioctylbutyl phosphate and the like; citric acid esters such as acetyl tributyl citrate and the like; and mixtures thereof. Preferred are aqueous compositions containing at least about 80% by weight of water, most preferably at least about 90, or up to about 20% by weight of the composition of an organic solvent, most preferably a maximum of about 10%. The most preferred aqueous compositions are free of organic solvent.

Further, as used herein, the term "gelatin" includes any suitable hydrophilic colloidal material, or mixture, useful as a binder in a layer of a photosensitive element and having a positive charge balance on the polymer that is not sensitive to pH changes; that is, a change in pH will not change the positive to a negative charge.

Suitable hydrophilic colloidal materials include both naturally occurring substances such as proteins, protein derivatives, cellulose derivatives such as cellulose esters; gelatin including alkali-treated and acid-treated gelatin, phthalated gelatin, and the like; polysaccharides such as dextran, gum arabic, zein, casein, pectin, collagen derivatives, collodion, agar-agar, arrowroot, albumin and the like. Generally, it is preferred that the aqueous gelatin composition contains at least about 2% by weight of the composition of gelatin; most preferred are aqueous gelatin compositions in which a gelatin is the hydrophilic colloid.

Other hydrophilic colloidal materials which can be used include poly(vinyllactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkylsulfonic acid copolymers, sulfoalkylacrylamide copolymers, polyalkyleneimine copolymers, polyamines, N,N-dialkylaminoalkyl acrylates, vinyl imidazole copolymers, vinyl sulfide copolymers, halogenated styrene polymers, amineacrylamide polymers, polypeptides and the like. Other exemplary colloids are disclosed, for example in U.S. Pat. Nos. 2,691,582; 2,787,545; 2,956,880; 3,132,945; 3,138,846; 3,679,425; 3,706,564; 3,813,251; 3,852,073; 3,879,205; 3,003,879; 3,284,207; 3,748,143; 3,536,491 and the like, the disclosures of which are hereby incorporated herein by reference.

A copolymer of any suitable alkali metal or ammonium salt of a sulfonic acid containing monomer with any suitable unsaturated monomer, preferably having a number average molecular weight greater than about 300,000, can be used as the viscosity enhancing agent or thickener of the invention. Any suitable method can be used to prepare the viscosity enhancing polymers of the invention as is known in the art. For example, any suitable base can be reacted with any suitable ester to form the alkali metal or ammonium salt of the sulfonic acid containing copolymer including acryloyl-oxymethyl bisulfite, acryloyloxymethyl bisulfate, methacryloyloxymethyl bisulfite, methacryloyloxymethyl bisulfate, acryloyloxyethyl bisulfite, acryloyloxyethyl bisulfate, methacryloyloxyethyl bisulfite, methacryloyloxyethyl bisul-fate, acryloyloxypropyl bisulfite, acryloyloxypropyl bisul-fate, methacryloyloxypropyl bisulfite, methacryloyloxypropyl bisulfate, acryloyloxybutyl bisulfite, acryloyloxybutyl bisulfate, methacryloyloxybutyl bisulfite methacryloylxybutyl bisulfate, and the like. The corresponding salt which is reacted with an unsaturated monomer to prepare the copolymer of the invention can be obtained by reacting the ester with a base as is well known.

Any suitable water soluble unsaturated monomer can be reacted with the sulfonic acid salt in preparing the thickener of the invention. Some such suitable unsaturated monomers include alpha, beta-ethylenically unsaturated hydrocarbons such as ethylene, propylene, styrene, and the like; vinyl esters such as vinyl acetate, vinyl propionate, vinyl butyrate, and the like, vinyl ethers such as methyl vinyl ether, ethyl vinyl ether and the like; acrylic and methacrylic acids, esters and amides including acrylic acid, methacrylic acid, ethyl acrylate, methylmethacrylate, acrylamide, methacrylamide, 2-acetoacetoxyethyl methacrylate, methacryloyloxyethylaceto-acetamide, thiapentyl acrylate, thiapentyl methacrylate, N-(3-thiapentyl)methacrylamide; vinyl esters, ketones, and amides, including vinyl acetate, vinyl propionate, vinyl pyrrolidone, N-vinylacetamide, N-methyl-N-vinylacetamide, and the like and mixtures thereof.

Preferred are copolymers of potassium- or sodium-2-acrylimido-2-methylpropanesulfonate having a number average molecular weight greater than about 300,000. Most preferred are copolymers with acrylamide and/or methacrylamide.

The viscosity increasing copolymers of the invention can be added to aqueous gelatin compositions in solution at a maximum of about 8% by weight of the viscosity enhancing component in aqueous solution. Any lower concentration can be used determined only by the amount of dilution the system can tolerate. Any of the solvents or diluents disclosed herein can be used alone or in combination.

Any suitable viscosity-enhancing amount of the thickener of the invention can be added to a hydrophilic colloid composition as defined herein at any point which requires a high viscosity after and a low viscosity before the addition. Suitable viscosity enhancing amounts of the copolymer generally comprise at least about 5% by weight of the copolymer, preferably from about 5% to about 15% by weight, based on the weight of the gel or hydrophilic colloid composition.

An electrostatic interaction takes place between the negatively charged groups on the viscosity-enhancing copolymer and the positively charged groups on the hydrophilic colloid or gelatin substantially instantaneously. Generally, the kinetics of the interaction are so fast that the reaction goes to completion with thickening occurring in less than about 3 seconds.

The hydrophilic colloid solutions to be thickened in accordance with the invention can be used to prepare sensitized or nonsensitized layers in single, dual, or multilayered photographic films coated on a support individually, simultaneously, or both as described in U.S. Pat. Nos. 2,761,791, 3,508,947, 2,941,898, 3,526,528, and the like. Photographic elements can be prepared by coating a support with an emulsion, overcoat, undercoat, and the like layers in the sequence required to provide the desired photographic element layer combination by any suitable coating method such as dip coating, air knife coating, bead coating, curtain coating, extrusion coating using a hopper as described in U.S. Pat. No. 2,681,294, and the like.

Photographic coating solutions of the invention can be coated onto any suitable support including flexible supports conventionally employed in photographic light-sensitive materials including, for example, a film of cellulose nitrate, cellulose acetate, cellulose acetate butyrate, cellulose acetate propionate, polystyrene, polyethylene terephthalate, polycarbonate, laminates, glass, paper, polyolefins such as polyethylene, polypropylene, ethylene butene copolymers, and the like. The film can be laminated, modified to improve adhesion, subbed, treated using a corona discharge, UV irradiated, flame treated, surface roughened, and otherwise pretreated. It can be transparent or opaque depending on end use, and colored with dyes and/or pigments as desired.

The coating layer or multilayers deposited on the support is preferably a photographic emulsion thickened in accordance with the invention. Silver halide emulsions thickened in accordance with the invention can be suspensions of silver halides such as silver chloride, silver bromide, silver iodide, silver chlorobromide, silver iodobromide, silver chloroiodobromide or mixtures thereof in the hydrophilic colloid solution. Such emulsions can be prepared by any suitable method known in the art including an ammonia method, a neutral method, an acidic method, a double jet method, a control jet method and so on.

The light sensitive silver halide emulsion can be chemically sensitized using natural sensitizers present in gelatin or palladium salts or noble metal salts or cyanine or merocyanine dyes and the like. Reduction sensitization can be achieved using reducing agents such as polyamines, tin(I) salts and the like. Spectral sensitization or color sensitization can be achieved using cyanine dyes either alone or in combination with styryl dyes and the like depending on the wavelength range to be sensitized, desired sensitivity, and so on.

A light sensitive silver halide coating composition thickened in accordance with the invention can also be stabilized using antifogging agents or stabilizers. Suitable compounds for these purposes include azaindenes, mercaptotetrazoles, salts of noble metals such as palladium and platinum, oximes, imidazolium salts, tetrazolium salts, and the like and mixtures thereof.

The compositions of the invention can be hardened using any suitable organic and inorganic hardeners, either alone or in combination and in free or blocked form. Some suitable hardening agents include aldehydes such as formaldehyde and free dialdehydes such as succinaldehyde, glutaraldehyde and the like, blocked dialdehydes, alpha diketones, active esters, sulfonate esters, active halogen compounds, triazines and diazines, epoxides, aziridines, active olefins having two or more active bonds, blocked active olefins, carbodiimides, isoxazolium salts unsubstituted in the 3 position, esters of 2-alkoxy-N-carboxydihydroquinoline, N-carbamoyl and N-carbam-oyloxypyridinium salts, derivatives of dioxane, oxypolysacch-arides such as oxystarch, oxy plant gums, methylols, isoxa-zoles, active vinyl containing hardeners such as vinyl sulfonyl ethers, inorganic hardeners such as chromium salts, any of those described, for example, in U.S. Pat. Nos. 3,232,764; 3,819,608; 3,542,558; 3,106,468; 3,951,940; 3,189,459; 3,490,911; 3,360,372; 4,013,468; 4,028,320; 3,396,029, the disclosures of which are hereby incorporated herein by reference, and the like. Preferred are bis-vinylmethylsulfone and bis-vinylmethylsulfonylether.

Light sensitive compositions of the invention can contain any suitable filter dyes or irradiation preventing agents and dyes. The dyes can be mordanted as known in the art. The compositions can contain, individually or in combination, thiazolium salts, azaindenes, urazoles, sulfocatechols, mercaptotetrazoles, nitrones, indoles and the like; brightening agents such as stilbenes, triazines, oxazoles, coumarins, and the like; water-soluble whitening agents; oil soluble whitening agents; UV absorbants such as benzotriazoles, thiazolidines, thiazolidones, and the like; color fog preventing agents such as hydroquinone derivatives and the like and mixtures.

Any suitable couplers can be used in the coating compositions of the invention including the open chain type ketomethylene yellow dye forming couplers such as benzoylacetanilide and pivalylacetanilide type couplers, preferably pentanamide, N-[2-chloro-5-[(hexadecylsulfonyl)amino]phenyl]-4,4-dimethyl-3-oxo-2-[4-[[4-(phenylmethoxy)phenyl]sulfonyl]phenoxy] ($C_{48}H_{63}ClN_2O_8S_2$); the magenta color forming couplers such as pyrazolone and indazolone type couplers; the cyan color forming couplers such as phenol, naphthol and the like types.

The color couplers can possess a coupling-off group on the active carbon atom at the coupling position. Diffusion resistant couplers having a ballast group in the molecule of the color couplers are preferred. The terms coupling-off group, ballast group and diffusion resistant have the conventional meaning known in the art. Hydrophobic groups having at least eight carbon atoms such as an alkyl group or an alkylaryl group as a ballast group can be introduced into the coupler molecule using conventional means to render the couplers diffusion resistant. The ballast group can be connected directly to the coupler skeleton, or it can be connected through an amino, ether, thioether, carbamido, sulfamido, urea, ester, imido, carbonyl, sulfonyl and the like bond. Representative diffusion resistant couplers are described in U.S. Pat. No. 4,224,403, which is hereby incorporated herein for all that it discloses.

The coating compositions of the invention can also contain color developers, development inhibitor releasing compounds, diffusible dye releasing couplers and the like.

Light sensitive compositions of the invention can also contain surface active agents such as, for example, natural surface active agents including saponin; nonionic surface active agents such as alkyleneoxides, glycerins, glycidols and the like; cationic surface active agents such as higher alkyl amines, quaternary ammonium salts, pyridine, heterocyclic ring compounds, phosphoniums, sulfonium compounds and the like; anionic surface active agents containing acid groups such as carboxylic acid, sulfonic acid, sulfuric acid, sulfate, phosphate and the like groups; amphoteric surface active agents including amino acids, aminosulfonic acids, sulfates, phosphates of aminoalcohols and the like.

Photographic coating compositions of the invention can contain other additives known to be beneficial in photographic emulsions including speed increasing compounds, stabilizers, plasticizers or lubricating agents such as long chain fatty acids, silicone resins, N-alkyl-B-amino propionates, palmityl palmitate, and the like and any other suitable coating aids.

Regardless of the other components, it remains possible to selectively thicken hydrophilic colloid coating compositions in accordance with the invention. In particular, the ability to add the thickener of the invention very far downstream in the coating operation significantly reduces the problems of pressure drop and solubility or insolubility of the solid components while still providing desirable reduced flow after coating and reduced wave growth. The ability to add the thickener far downstream also obviates problems which arise when it becomes necessary to pump high viscosity melts. It also obviates melt hold problems associated with prolonged contact of the components with the thickener prior to coating. In addition, the in-line addition of a fast acting thickener of the invention permits selective on-line viscosity control by simply changing the flowrate of the thickener. In a process control loop type system, viscosity control and the associated reduction in process variability can be achieved by simply using an in-line viscometer. An obvious advantage is that melt viscosity changes can be accomplished on the fly simply by changing the flow rate of thickener, adding a degree of freedom and flexibility to coating processes.

The invention is further illustrated but is not intended to be limited by the following examples in which all parts and percentages are by weight unless otherwise specified.

EXAMPLE 1

This example illustrates the pressure drop required to deliver a 120 centipoise imaging layer using in-line addition of a fast acting thickener in accordance with the invention as shown in FIG. 1 (Method A) compared to that required when a polymeric thickener is added in supply vessel 11 in accordance with prior practice as shown in FIG. 2 (Method B).

Method A

About 108 g of blue sensitive silver bromide, 333 g of gelatin, and 182 g of ($C_{48}H_{63}ClN_2O_8S_2$) as a coupler, were dissolved in about 5156 ml of water with stirring and heating at a temperature of about 40° C. The resulting aqueous solution having a viscosity of about 30 centipoise was loaded into supply vessel 11 of FIG. 1 from which it was pumped by means of pump 13 at a rate of about 75 ml/sec through filter 15 and deaerator 17.

About 4.7 g of a copolymer of sodium-2-acrylamido-2-methylpropanesulfonate and acrylamide having a number average molecular weight ranging from about 500,000 to about 800,000 were mixed with about 54.8 ml of water and disposed in supply vessel 21. The thickener composition, having a viscosity of about 10 centipoise was drawn from supply vessel 21 by means of pump 23 and fed through filter 25 and deaerator 27 after which it was fed into the gelatin composition at a flow rate of about 5 ml/sec at 31 to provide a concentration of the viscosity enhancer of the invention in the aqueous gelatin composition of about 0.1% by weight based on the total weight of the aqueous composition. The viscosity of the resulting aqueous gelatin composition [Composition 1A] increased from 30 to 120 centipoise (a 400% increase) instantly (less than 3 seconds).

The thickened aqueous composition was then passed through mixer 33 to coating hopper 35 from which the composition was coated onto subbed polyethylene terephthalate film base 39 as it moved over roller 37 to provide an imaging layer comprising about 4.6 mg/m$^2$ silver bromide, 10.7 mg/m$^2$ gelatin, 7.9 mg/m$^2$ of the coupler, and 1.9 mg/m$^2$ of the sodium-2-acrylamido-2-methylpropanesulfonate/acrylamide copolymer.

The pressure head supplied by pump 13 to provide the flow rate of 75 ml/sec for the aqueous gelatin composition having a viscosity of about 30 centipoise was 670 kPa. The pressure head supplied by pump 23 was about 50 kPa due to the low viscosity and low flow rate of the polymer.

Method B

Composition 1A described above was disposed in supply vessel 11 of FIG. 2. The composition 1A viscosity of 120 centipoise remained constant as the composition was pumped out of supply vessel 11 through filter 15, deaerator 17, and flowmeter 19 into mixer 21 and thereafter into coating hopper 23 from which it was applied to a subbed polyethylene terephthalate film base 27 moving over roller 25. The resulting imaging layer comprised about 4.6 mg/m$^2$ silver bromide, 10.7 mg/m$^2$ gelatin, 7.9 mg/m$^2$ of ($C_{48}H_{63}ClN_2O_8S_2$) as a coupler, and 1.9 mg/m$^2$ of the copolymer of sodium-2-acrylamido-2-methylpropanesulfonate and acrylamide described above.

The pressure head required to deliver the coating to the film base at a flow rate of about 80 ml/sec was 1500 kPa. This represents an increase in overall system pressure drop of 2.3 times compared to the pressure drop required for Method A above. Such a large increase in pressure makes the coating of a layer having the viscosity of composition 1A impossible without significant upgrades to the entire delivery system.

EXAMPLE 2

This example illustrates the pressure drop required to deliver a 15 centipoise hardener bearing imaging layer using both in-line addition of a fast acting thickener and hardener in accordance with the invention (FIG. 1/Method A) and addition of a polymeric thickener in the supply vessel with in-line (dualed in) addition of a hardener due to the reactivity of the hardener with gelatin according to prior practice (FIG. 2/Method B).

Method A

About 108 g of blue sensitive silver bromide, 333 g of gelatin, and 182 g of the coupler of Example 1, were dissolved in about 6216 ml of water with stirring and heating at a temperature of about 40° C. The resulting aqueous solution having a viscosity of about 3 centipoise was loaded into supply vessel 11 of FIG. 1 from which it was pumped by means of pump 13 at a rate of about 75 ml/sec through filter 15 and deaerator 17. About 4.7 g of the sodium-2-acrylamido-2-methylpropanesulfonate/acrylamide copolymer of Example 1 and about 1.2 g of bisvinylmethyl sulfone as a hardener were mixed with about 120 ml of water and disposed in supply vessel 21. The hardener/thickener composition, having a viscosity of about 3 centipoise was drawn from supply vessel 21 by means of pump 23 and fed through filter 25 and deaerator 27 after which it was fed into the gelatin composition at a flow rate of about 55 ml/sec at 31 to provide a concentration of the viscosity enhancer of the invention in the aqueous gelatin composition of about 0.1% by weight based on the total weight of the aqueous composition. The viscosity of the resulting aqueous gelatin composition [Composition 2A] increased to 15 centipoise (a 500% increase) substantially instantly (less than 3 seconds). The thickened aqueous composition then passed through mixer 33 to coating hopper 35 from which the composition was coated onto subbed polyethylene terephthalate film base 39 as it moved over roller 37 to provide an imaging layer comprising about 4.6 mg/m$^2$ blue sensitive silver bromide, 10.7 mg/m$^2$ gelatin, 7.9 mg/m$^2$ of the coupler, and 1.9 mg/m$^2$ of the sodium-2-acrylamido-2-methylpropanesulfonate/acrylamide copolymer.

The pressure head supplied by pump 13 to provide the flow rate of 75 ml/sec for the aqueous gelatin composition was 375 kPa.

Method B

Composition 2A described above minus the hardener was disposed in supply vessel 11 of FIG. 1. The viscosity of 120 centipoise remained constant as the composition was pumped out of supply vessel 11 through filter 15, deaerator 17, and flowmeter 19. About 1.2 g of bis-vinylmethylsulfone as the hardener were dissolved in about 64 ml of water and disposed in supply vessel 21. The hardener composition, having a viscosity of about 1 centipoise was drawn from supply vessel 21 by means of pump 23 and fed through filter 25 and deaerator 27 after which it was fed into the gelatin composition at a flow rate of about 50 ml/sec at 31. The viscosity of the resulting aqueous gelatin composition increased to 15 centipoise. The hardener containing coating composition was then passed through mixer 33 to coating hopper 35 from which the composition was coated onto subbed polyethylene terephthalate film base 39 as it moved over roller 37 to provide an imaging layer comprising about 4.6 mg/m$^2$ silver bromide, 10.7 mg/m$^2$ gelatin, 7.9 mg/m$^2$ of the coupler, 2.6 mg/m$^2$ of the hardener, and 1.9 mg/m$^2$ of the sodium-2-acrylamido-2-methylpropanesulfonate/acrylamide copolymer.

The pressure head required to deliver the coating to the film base at a flow rate of about 80 ml/sec was 1100 kPa. This represents an increase in overall system pressure drop of 2.9 times compared to the pressure drop required for Method A above. Such a large increase in pressure makes the coating of a layer having the viscosity of composition 2A impossible without significant upgrades to the entire delivery system.

The advantages of the invention are further illustrated when considering the production delivery system limit for viscosity and flow rate as given in the following equation: Flow (ml/sec)×Viscosity (cps)</=5000. This equation, when applied to the examples, provides production delivery system limits of 2250 and 225 for Method A of Examples 1 and 2, respectively, and 9600 for each Method B. Accordingly, the results of Method B in both of the Examples fail to meet the production delivery system limit and would not provide a viable delivery option.

Any of the components mentioned as suitable herein can be substituted for its counterpart in the foregoing examples with similar results.

Although the invention has been described in considerable detail in the foregoing, it is to be understood that such detail is solely for the purpose of illustration and that variations can be made by those skilled in the art without departing from the spirit and scope of the invention except as set forth in the claims.

What is claimed is:

1. A process for coating a substrate with an aqueous gelatin coating composition which comprises increasing the viscosity of the aqueous gelatin coating composition by adding in-line in the handling and delivery of the aqueous gelatin coating composition to a substrate through a coating means, from about 3 to about 15 percent by weight based on the weight of the gelatin composition of a copolymer of an alkali metal or ammonium salt of a sulfonic acid containing polymer and an unsaturated monomer, said addition being made substantially immediately before the composition to be applied to the substrate enters the coating means, and substantially immediately increasing the viscosity of the gelatin composition by at least about 200%.

2. The process of claim 1 wherein the copolymer is a copolymer of acrylamide and sodium-2-acrylamido-2-methylpropanesulfonate.

3. The process of claim 1 wherein the coating composition contains at least about 2% by weight of gelatin.

4. The process of claim 3 wherein the coating composition contains at least about 80% by weight of water.

5. The process of claim 1 wherein the copolymer has a number average molecular weight of at least about 300,000.

6. The process of claim 1 wherein the coating composition is a light sensitive emulsion containing silver halide.

7. The process of claim 6 wherein an effective amount of a hardener is added to the aqueous gelatin coating composition.

8. The process of claim 7 wherein the hardener is bisvinylmethylsulfone.

9. The process of claim 7 wherein the hardener is bisvinylmethylsulfonylether.

10. The process of claim 6 wherein the light sensitive aqueous gelatin coating composition is pumped in-line through a filter and a deaerator and mixed in-line with the copolymer at a mixer before entering a means for coating it onto a substrate.

11. The process of claim 6 wherein a photographic element is prepared by coating a photographic film base with the copolymer-containing light sensitive coating composition.

12. The process of claim 11 wherein the photographic element is prepared by coating a photographic film base with a sodium-2-acrylamido-2-methylpropanesulfonate/acrylamide copolymer-containing light sensitive coating composition.

13. The process of claim 4 wherein the coating composition contains at least about 90% by weight of water.

14. The process of claim 1 wherein the viscosity of the gelatin composition increases by at least about 200% in less than about three seconds after the addition is made.

15. The process of claim 7 wherein the hardener is a component of the copolymer composition.

* * * * *